United States Patent [19]

Bonstead et al.

[11] Patent Number: 4,770,330
[45] Date of Patent: Sep. 13, 1988

[54] MULTI-PIECE STRADDLE BED TOOL BOX FOR USE WITH PICKUP TRUCKS

[75] Inventors: Douglas L. Bonstead, Ankeny; William S. Wagner, Jr., Chariton, both of Iowa

[73] Assignee: Deflecta-Shield Corporation, West Des Moines, Iowa

[21] Appl. No.: 941,799

[22] Filed: Dec. 15, 1986

[51] Int. Cl.[4] .............................................. B60R 9/00
[52] U.S. Cl. ................................ 224/42.42; 224/273; 296/37.6; 312/DIG. 33
[58] Field of Search ..................... 224/273, 311, 42.42; 296/37.1, 37.6; 220/333, 342; 280/769; 190/21, 22, 112, 113, 114; 312/DIG. 33; D12/157

[56] References Cited

U.S. PATENT DOCUMENTS

| | | |
|---|---|---|
| D. 235,583 | 6/1975 | Parry . |
| D. 257,340 | 10/1980 | Grossman . |
| D. 259,413 | 6/1981 | Rehkopf . |
| D. 274,139 | 6/1984 | Suffern et al. . |
| D. 278,995 | 5/1985 | Waters . |
| 2,398,299 | 4/1946 | Frandsen ............................... 190/21 |
| 2,722,352 | 11/1955 | Dehnel . |
| 2,978,153 | 4/1961 | Brindle . |
| 3,204,288 | 9/1965 | Adams ................................ 220/342 |
| 3,640,423 | 2/1972 | Parker et al. . |
| 3,664,704 | 5/1972 | Ellis . |
| 3,727,971 | 4/1973 | Sisler . |
| 3,854,621 | 12/1974 | Parry . |
| 4,288,011 | 9/1981 | Grossman . |
| 4,488,669 | 12/1984 | Waters . |
| 4,531,774 | 7/1985 | Whatley . |
| 4,580,827 | 4/1986 | Feagan . |

*Primary Examiner*—Henry J. Recla
*Assistant Examiner*—David Voorhees
*Attorney, Agent, or Firm*—Cullen, Sloman, Cantor, Grauer, Scott & Rutherford

[57] ABSTRACT

A tool box designed to be size adjustable and for disassembly for easy storage and shipment. It has a removable center compartment and a pair of preferably identical end storage compartments adapted for conforming, straddle bed fitting in the bed of a pickup. The center section may be used for wide bed tool boxes, and may be removed for narrow bed tool boxes, and as well may be removed for storage. Thus, significant advantages of the three-piece straddle bed tool box are achieved.

8 Claims, 1 Drawing Sheet

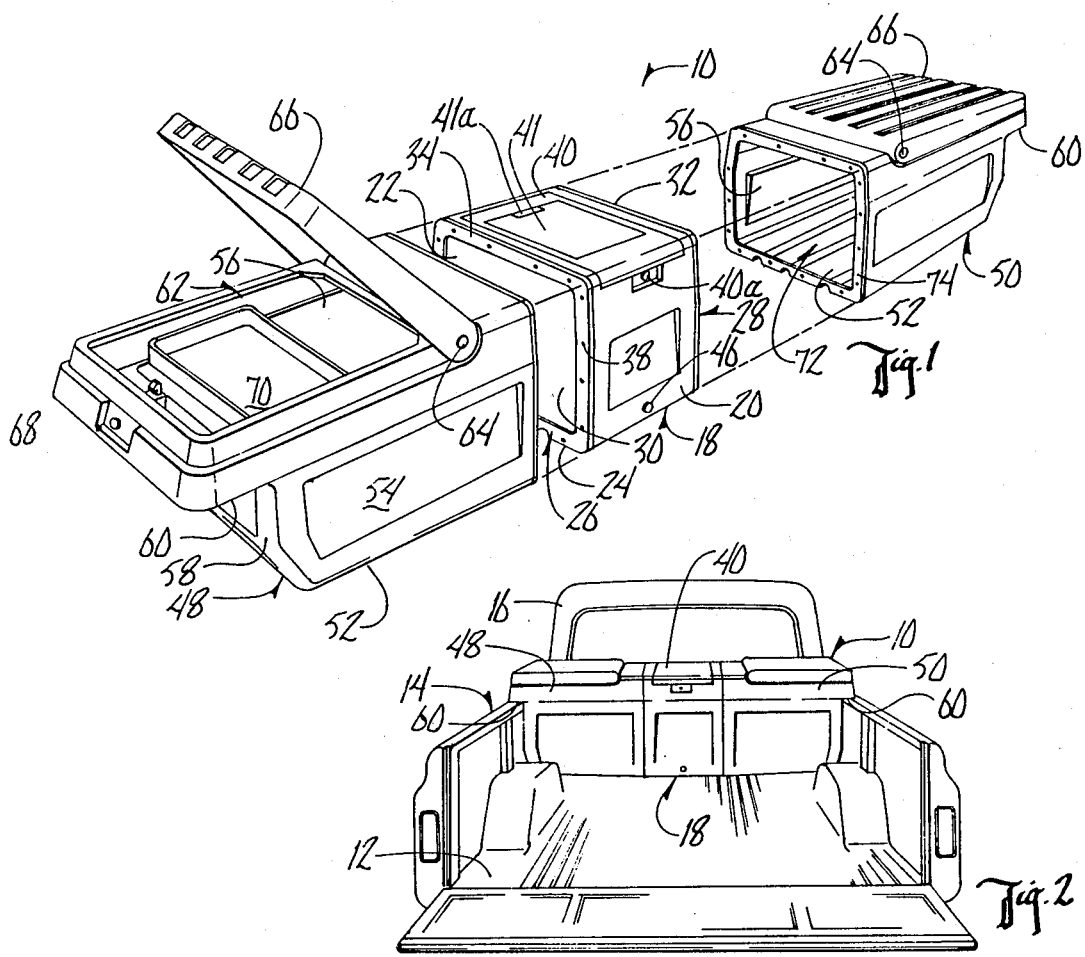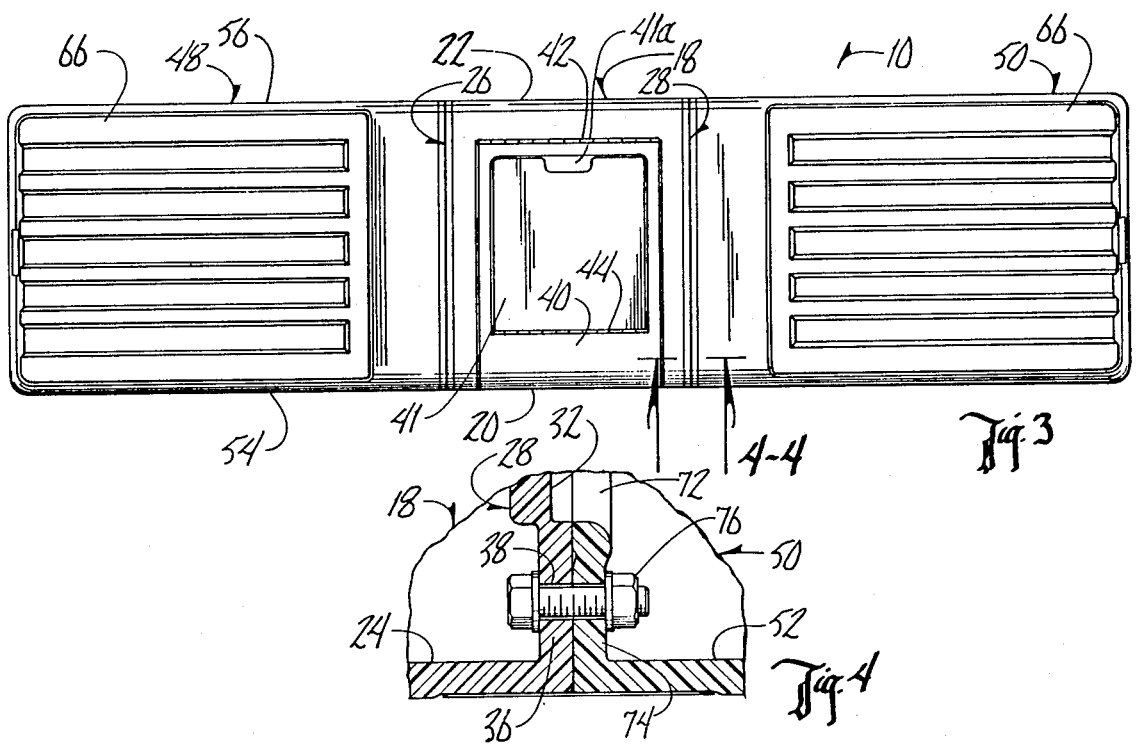

MULTI-PIECE STRADDLE BED TOOL BOX FOR USE WITH PICKUP TRUCKS

BACKGROUND OF THE INVENTION

This invention relates to a straddle bed tool box for use in the bed of a pickup, directly behind the cab of the pickup. Generally, straddle bed tool boxes are known and commercially available. The tool box compartment is usually adapted for at rest positioning across the sidewalls and the forward end of a pickup bed. The compartment usually has a removable lid structure so that tools and the like may be stored inside of the compartment. Such compartments have attained wide popularity and are now in common usage.

With the advent of more and more pickups of varying sizes, it has become an ever increasing problem to have a straddle bed tool box which is of universal fitting capability. Thus, for example for small bed pickups, such as many of the foreign pickups, conventional available units cannot be used. In today's automotive market there are commonly large bed pickups, mid-size bed pickups, and the mini or compact bed pickups. All of these have a differing width and thus would, and do, require a differing length straddle box to traverse the width of the pickup bed. This, of course, makes a universal straddle bed tool box very difficult to achieve.

Moreover, straddle bed tool boxes are extremely difficult to package and ship because of their large bulk and length. Thus, shipment and storage of the same from remote manufacturing facilities to automotive accessory stores has been a constant problem in the art.

It is a primary objective of the present invention to provide a straddle bed tool box which, because of its three piece configuration is versatile and can be used with pickup truck bed widths varying from full-size, to mid-size, to compacts.

It is another primary objective of the present invention to provide a three-piece straddle bed tool box which can be disassembled and shipped easily in a small UPS shipping package.

It is another objective of the present invention to provide a three-piece straddle bed and tool box which has end sections which are interchangeable and identical.

A still further objective of the present invention is to provide a straddle bed tool box which has a center section which is capable of ice storage for storing beverages in a cooling environment.

It is still another objective of the present invention to provide a straddle bed tool box which can be conveniently formed from molded plastic, which is simple and inexpensive to manufacture and which can be easily assembled with a minimum of labor.

SUMMARY OF THE INVENTION

This invention relates to a three-piece straddle bed tool box especially adapted for use with all available sizes of pickups. The box comprises a removable center compartment and a pair of preferably identically formed molded plastic end compartments. The center compartment may be used for wide bed trucks, or may be eliminated for narrower bed trucks, and if desired the end walls of the center compartment may be removed, making a continuous elongated interior compartment for tools. When the center compartment is removed, two end compartments may be attached directly together. The center compartments may be available in varying lengths in order to accommodate the various bed width of trucks.

The following detailed description of the invention is offered to demonstrate how the previously outlined objectives of the invention, as well as others, are accomplished.

BRIEF DESCRIPTION OF THE DRAWINGS

FIG. 1 is a perspective view of the three-piece straddle bed tool box.

FIG. 2 is a perspective view of a pickup truck bed with the three-piece straddle tool box of the present invention in place therein.

FIG. 3 is a plan view of the tool box.

FIG. 4 is a sectional view along line 3—3 of FIG. 3 showing in detail how the center section lips and end section lips are sealed together.

DETAILED DESCRIPTION OF THE INVENTION

Referring now to the drawings in detail, wherein reference numerals indicate like parts throughout the several figures, reference numeral 10 refers to the straddle bed tool box generally. As best depicted in FIG. 2, the straddle bed tool box 10 is positioned in the bed 12 of pickup truck 14, directly behind its cab 16. It thus traverses the width of the bed 12 of pickup 14. The straddle bed tool box 10 has a removable center section or compartment 18. Center compartment 18 is defined by front, rear and bottom walls 20, 22 and 24, respectively. As can be seen, center section 18 also has first and second ends 26 and 28 and corresponding end walls 30 and 32. Ends 26 and 28 are defined by fastening lips 34 and 36 which have a plurality of bolt receiving apertures 38.

As will be explained hereinafter, in order to accommodate varying widths of pickup truck bed boxes, center section or compartment 18 may come in variable lengths which may be ordered, as needed. Moreover, regardless of its length, it is of identical construction to that shown herein.

Fitting over the open top of the center section 18, defined by front, rear and bottom walls 20, 22 and 24 is covering lid 40. Lid 40 has a pair of oppositely disposed hinges 42 and 44 which allow opening of lid 40 and inner lid 41 from either the front or the rear (inner lid 41) by means of latches 40a and 41a.

The end walls 30 and 32, as will hereinafter be described in detail, may be cut from center section 18 if desired. Likewise, center section 18 may optionally have a drain hole 46 to allow draining of water in the event that center section or compartment 18 is used as an ice chest.

Positioned on each end of center section 18 for attachment in the manner depicted in FIG. 4 to the respective ends 26 and 28 are a pair of identical configurations, preferably of molded plastic tool box compartments, each of which is generally referred to by like numbers, since they are of like configuration. The end compartments are referred to generally as 48 and 50. Compartments 48 and 50 each include a bottom wall 52 which sits directly on the bed 12 of the pickup and an integrally formed front, rear and sidewalls, respectively 54, 56 and 58.

As depicted, shoulder 60 rests on the upper surface of the front, rear and sidewalls, and is integrally formed therewith so that it may rest over the wall of the pickup bed. Shoulder portion 60 defines the upper opening 62. Opening 62 has a hinged (64) lid 66 which may be moved from an open position as depicted with compartment 48 to a closed position as depicted with compartment 50. Lid 66 may be latch closed by latch mechanism 68. Positioned in the compartment 48 and 50 may be certain plastic blow molded trays such as 70 which may be removed if desired. End compartments 48 and 50 also have, opposite sidewall 58, open ends 72. Opening 72 is defined at its perimeter by fastening lip 74. Fastening lip 74 may be bolted by bolts 76 to fastening lip 34 and 36 of the center compartment 18 or the fastening lip 74 of one end compartment 48 may be attached directly to the fastening lip 74 of another end compartment 50, both in the manner depicted in FIG. 4.

Because there are center compartments 18 of varying lengths, the overall length of the three-piece box 10 may be adjusted to accommodate traversing the width of varying dimension pickup beds. Thus one may custom order center sections as seen fit to accommodate various beds. Each purchaser will use identical end portions 48 and 50, but vary only the dimensions of the center section. In this manner the unit may be conveniently assembled and correspondingly disassembled. Likewise, it may be shipped with the two end compartments 48 and 50 stacked one upon the other and with the center section for compartment 128 placed inside thereof to minimize the space and packing needed for shipment. Thus, the package can be of such a dimension that it can be conveniently shipped by UPS, contrary to the restrictive package size heretofore used, which was prohibitive for UPS shipment.

Certain construction features are worthy of mention. If desired, there may be a gasket fitted between fastening lips 34, 36 and lip 74. Ideally the entrie construction of the unit is preferably formed of a strong molded polymeric plastic configuration which is rigid and known to stand durable under a variety of weather conditions.

It will thus be seen that the objects set forth hereinbefore are sufficiently attained. The foregoing illustration shows the most preferred embodiment of the invention as currently known, but certain changes may be made in the above construction without departing from the scope of the invention.

What is claimed is:

1. A multi-piece straddle bed tool box for pickups which have a cab and a bed, said bed being defined by at least two spaced apart bed walls, comprising:
   at least two storage compartments a removable center compartment defined by front, rear and bottom walls, and having first and second end walls, and a covering lid, each of said end walls having a fastening lip; and
   means for removably attaching each of said first and second end wall fastening lips to said storage compartments, respectively, each said storage compartment having a movable top lid, said storage compartments being adapted for conforming straddle bed fitting in the bed of a pickup truck by extending from one bed wall across to the other bed wall, each of said storage compartments having a shoulder portion which extends over one of said bed walls, said straddle bed tool box being adapted for positioning directly behind the cab.

2. The straddle bed tool box of claim 1 wherein said center compartment end walls are inwardly positioned with respect to said fastening lips.

3. The straddle bed tool box of claim 2 wherein said center compartment lid is hingedly attached to said center compartment.

4. the straddle bed tool box of claim 3 wherein said center compartment lid is attached to said center compartment by two hinges to allow opening from either the front or rear thereof.

5. The straddle bed tool box of claim 1 wherein each of said storage compartments has a top lid which is hinged for movement from open to closed position.

6. The straddle bed tool box of claim 5 wherein each said storage compartment top lid has an associated latch mechanism for releasably latching said top lid to the storage compartment.

7. The straddle bed tool box of claim 1 wherein said center compartment has a water drain hole for draining of water therefrom.

8. The straddle bed tool box of claim 1 wherein said center compartment end walls are positioned in a recessed position with respect to said fastening lips, and thus adapted for easy cut-out if desired.

* * * * *